US012809784B2

(12) United States Patent
Raja

(10) Patent No.: US 12,809,784 B2
(45) Date of Patent: Nov. 24, 2026

(54) CACHE REPLACEMENT CONTROL

(71) Applicant: Arm Limited, Cambridge (GB)

(72) Inventor: Abhishek Raja, Niagara Falls, NY (US)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 18/768,696

(22) Filed: Jul. 10, 2024

(65) Prior Publication Data

US 2026/0017209 A1 Jan. 15, 2026

(51) Int. Cl.
*G06F 12/128* (2016.01)
*G06F 12/0871* (2016.01)
*G06F 12/126* (2016.01)

(52) U.S. Cl.
CPC ........ *G06F 12/128* (2013.01); *G06F 12/0871* (2013.01); *G06F 12/126* (2013.01)

(58) Field of Classification Search
CPC ... G06F 12/0871; G06F 12/126; G06F 12/128
See application file for complete search history.

(56) References Cited

U.S. PATENT DOCUMENTS 7,461,208 B1 * 12/2008 Caprioli .............. G06F 12/0864 711/128
8,195,886 B2 * 6/2012 Ozer ...................... G06F 12/126 711/E12.075
9,727,488 B1 * 8/2017 Drerup ................ G06F 12/0842
11,275,692 B2 * 3/2022 Bhoria .................. G06F 12/127
11,461,247 B1 * 10/2022 Bolbenes ............ G06F 12/1475
11,604,733 B1 3/2023 Krueger
2003/0023827 A1 * 1/2003 Palanca ................. G06F 12/123 711/E12.072
2010/0235579 A1 * 9/2010 Biles ..................... G06F 12/127 711/E12.001
2015/0186280 A1 * 7/2015 Lepak ................... G06F 12/121 711/136
2016/0092373 A1 * 3/2016 Doshi ................. G06F 12/0875 711/122
2017/0148130 A1 * 5/2017 Fishwick ............ G06F 12/0875
2017/0337133 A1 11/2017 Bolbenes et al.
2018/0165217 A1 6/2018 Greenspan
2019/0310948 A1 * 10/2019 Abhishek Raja ... G06F 12/1036
2020/0034303 A1 * 1/2020 Jagtap ................. G06F 12/1045
2022/0107901 A1 4/2022 Ishii et al.
2024/0126697 A1 4/2024 Hornung et al.

* cited by examiner

*Primary Examiner* — Aracelis Ruiz
(74) *Attorney, Agent, or Firm* — NIXON & VANDERHYE P.C.

(57) ABSTRACT

An apparatus comprises a set associative cache, and cache replacement control circuitry to select, for a given set of the set associative cache, a victim cache entry to be replaced with a new cache entry. The victim cache entry is selected based on cache replacement selection values indicative of a relative priority for selection as the victim cache entry. In response to identifying a plurality of highest victim priority cache entries having equal cache replacement selection values indicative of equal highest priority to be selected as the victim cache entry, the cache replacement control circuitry is configured to select the victim cache entry based on a set-specific selection criterion which favours selection of a victim cache entry belonging to a preferred way for the given set, wherein the preferred way differs between at least two sets of the set associative cache.

18 Claims, 9 Drawing Sheets

CACHE REPLACEMENT CONTROL

BACKGROUND

Technical Field

The present technique relates to the field of data processing. More particularly, it relates to cache replacement control.

Technical Background

A data processing system may have a cache, to cache information (e.g. data or instructions) for memory addresses predicted to be accessed in future. In response to a cache access request, a lookup is performed in the cache to detect whether the cache stores information associated with a target address specified by the cache request. If the cache request hits in the cache, the information can be accessed faster than when a miss occurs and the information is obtained from a further level of cache or from memory. If a cache request misses in the cache, a new cache entry can be allocated for the information associated with the target address. If there is no invalid entry available for allocation as the new cache entry, a victim cache entry can be selected to be replaced with the new entry. A cache replacement policy may be used to control selection of which entry is the victim cache entry.

SUMMARY

At least some examples of the present technique provide an apparatus comprising:

- a set associative cache comprising a plurality of cache entries; and cache replacement control circuitry to select, for a given set of the set associative cache, a victim cache entry to be replaced with a new cache entry,
- wherein the cache replacement control circuitry is configured to select the victim cache entry based on cache replacement selection values for a candidate set of cache entries of the given set, the cache replacement selection value for a given cache entry being indicative of a relative priority with which the given cache entry is to be selected as the victim cache entry, and in response to identifying a plurality of highest victim priority cache entries having equal cache replacement selection values indicative of equal highest priority to be selected as the victim cache entry, the cache replacement control circuitry is configured to select the victim cache entry from the plurality of highest victim priority cache entries based on a set-specific selection criterion,
- wherein the set-specific selection criterion favours selection of a victim cache entry belonging to a preferred way for the given set, wherein the preferred way differs between at least two sets of the set associative cache.

At least some examples provide computer-readable code for fabrication of an apparatus, comprising:

- a set associative cache comprising a plurality of cache entries; and
- cache replacement control circuitry to select, for a given set of the set associative cache, a victim cache entry to be replaced with a new cache entry,
- wherein the cache replacement control circuitry is configured to select the victim cache entry based on cache replacement selection values for a candidate set of cache entries of the given set, the cache replacement selection value for a given cache entry being indicative of a relative priority with which the given cache entry is to be selected as the victim cache entry, and
- in response to identifying a plurality of highest victim priority cache entries having equal cache replacement selection values indicative of equal highest priority to be selected as the victim cache entry, the cache replacement control circuitry is configured to select the victim cache entry from the plurality of highest victim priority cache entries based on a set-specific selection criterion,
- wherein the set-specific selection criterion favours selection of a victim cache entry belonging to a preferred way for the given set, wherein the preferred way differs between at least two sets of the set associative cache.

The computer-readable code may be stored on a computer-readable medium. The computer-readable medium may be non-transitory.

At least some examples provide a method comprising:

- selecting, for a given set of a set associative cache, a victim cache entry to be replaced with a new cache entry based on cache replacement selection values for a candidate set of cache entries of the given set, the cache replacement selection value for a given cache entry being indicative of a relative priority with which the given cache entry is to be selected as the victim cache entry, and
- in response to identifying a plurality of highest victim priority cache entries having equal cache replacement selection values indicative of equal highest priority to be selected as the victim cache entry, selecting the victim cache entry from the plurality of highest victim priority cache entries based on a set-specific selection criterion,
- wherein the set-specific selection criterion favours selection of a victim cache entry belonging to a preferred way for the given set, wherein the preferred way differs between at least two sets of the set associative cache.

Further aspects, features and advantages of the present technique will be apparent from the following description of examples, which is to be read in conjunction with the accompanying drawings.

DESCRIPTION OF EXAMPLES

Figure 1:
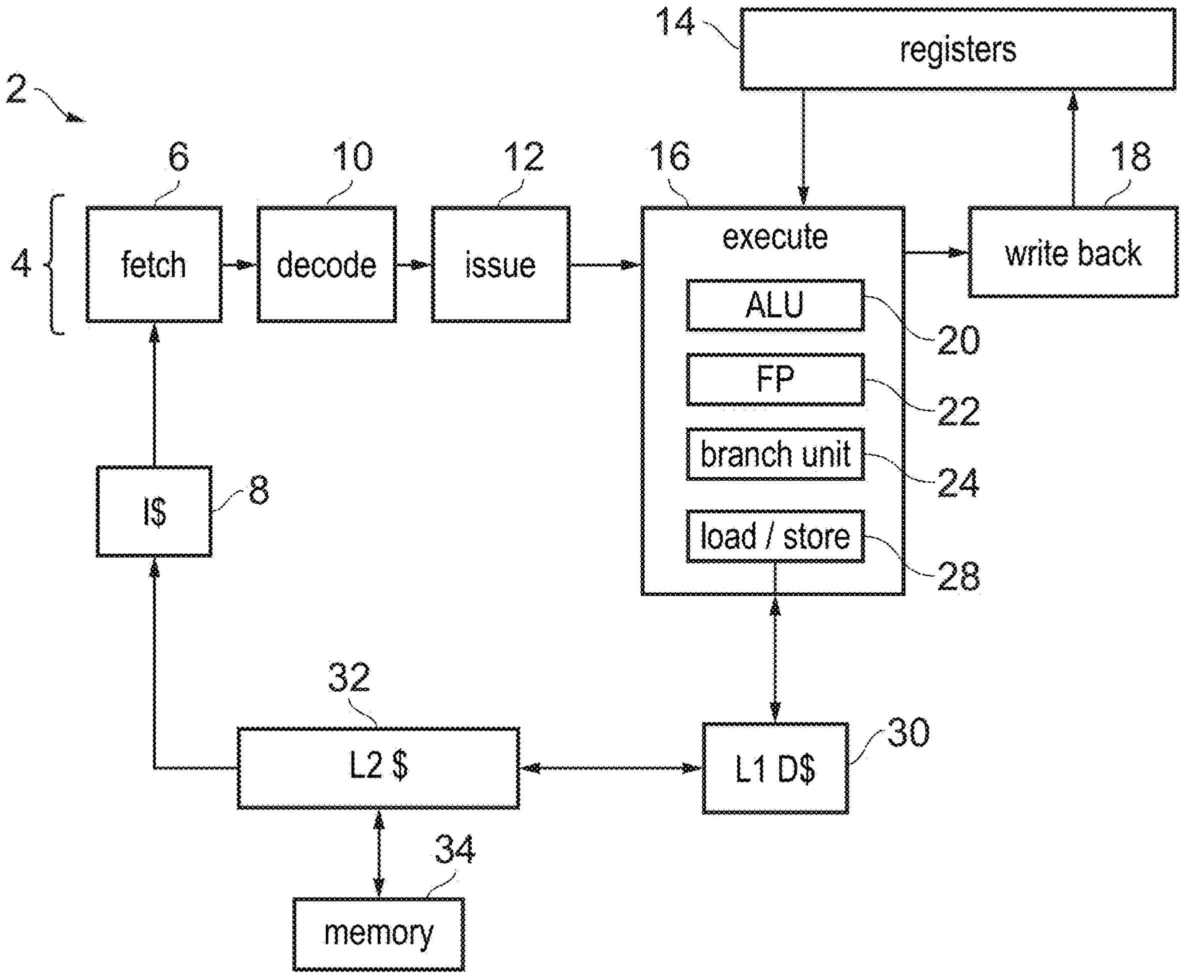
FIG. 1 schematically illustrates an example of a data processing apparatus.

In the techniques discussed below, an apparatus comprises a set associative cache comprising a plurality of cache entries. The set associative cache is a cache logically arranged as a plurality of sets of cache entries with each set comprising cache entries belonging to a number of ways, such that each cache entry in a set associative cache is associated with a set and a way. In a set associative cache having N ways (an N-way set associative cache), an item of information can be stored in a particular set selected based on the address of that item of information, and within that set may be stored in any of the N ways.

The apparatus also comprises cache replacement control circuitry to select, for a given set of the set associative cache, a victim cache entry to be replaced with a new cache entry. The given set of the set associative cache may be selected based on the address of the information to be allocated in the new cache entry. Selection of a victim cache entry may be carried out when allocating an item of information into a set having no free cache entries.

In the examples discussed below, cache entries are associated with a cache replacement selection value, the cache replacement selection value for a given cache entry being indicative of a relative priority with which the given cache entry is to be selected as the victim cache entry. The cache replacement control circuitry is configured to select the victim cache entry based on the cache replacement selection values for a candidate set of cache entries of the given set. The cache replacement selection value may for example be stored in the cache entry, or may be stored in a separate location corresponding to a particular cache entry. In some examples, the candidate set of cache entries may comprise all of the cache entries in the given set, or a particular selection of those cache entries.

A cache replacement selection value (e.g., a re-reference prediction value (RRPV)) may generally indicate a likelihood of the associated cache entry being reused. Various implementations of cache replacement selection values are possible, which may differ in how the initial value of the cache replacement selection value is set and if and how the cache replacement selection value is updated over time.

In some examples, the cache replacement selection value may be initialised having a particular value when the corresponding cache entry is allocated into the cache, where the initial value may vary depending on the current workload (as discussed below). The cache replacement selection value for a particular cache entry may be updated depending on the use of the cache. For example, cache replacement selection values may be periodically increased (such as every time a cache lookup misses), generally increasing the priority for each entry to be evicted the longer it remains in the cache. However, cache replacement selection values may also be updated to indicate a reduced priority for eviction in response to a cache lookup hitting against that cache entry (e.g., by decrementing the value or setting the value to indicate a lowest priority for eviction). Hence, the cache replacement selection values may be indicative of how frequently a particular cache entry has been accessed and therefore represent a likelihood that the associated cache entry will be requested in a future cache lookup.

In some cases, when selecting a cache entry for eviction there may be a plurality of highest victim priority cache entries having equal cache replacement selection values indicative of equal highest priority to be selected as the victim cache entry. In this case, the cache replacement control circuitry is configured to select the victim cache entry from the plurality of highest victim priority cache entries.

In some comparative examples, when there are a plurality of entries having equal cache replacement selection values indicative of equal highest priority to be selected as the victim cache entry, the victim cache entry may be selected using the same approach for each set. For example, the first way comprising a highest victim priority cache entry in some predetermined order (e.g., counting up starting from the first way, way 0, or counting down from the last way, way N−1) may be selected to be the way comprising the victim cache entry. For example, if the cache entries in ways 0, 3, and 5 for a given set all have the highest victim priority then when starting from way 0, the cache entry in way 0 may be selected as the victim cache entry (and if way 0 did not have the equal highest priority, then the entry in way 3 may be selected as the victim cache entry).

However, the inventor has realised that there are certain workloads where performance may be limited by using the same technique to select the victim cache entry from a plurality of highest victim priority cache entries for each set. For example, certain workloads may cause there to be a number of sets having several cache entries with an equal highest priority for eviction. Using the same technique to select the victim cache entry for each set may mean that, over several sets, the same way is selected for eviction (e.g., the cache entry in way 0 is selected for eviction for each set). This may lead to many cache accesses requesting access to the same way of the set associative cache. Accessing the same way for several sets can lead to cache access conflicts. For example, the hardware implementation of a cache may disallow parallel accesses to the same way in different sets. If many cache accesses target the same way and hence cannot be performed in parallel, then accessing a cache may be slower than if the cache accesses were made to different ways and hence could be performed in parallel.

In the examples discussed below, the cache replacement control circuitry is configured to select the victim cache entry from the plurality of highest victim priority cache entries based on a set-specific selection criterion, where the set-specific selection criterion favours selection of a victim cache entry belonging to a preferred way for the given set, wherein the preferred way differs between at least two sets of the set associative cache.

The set-specific selection criterion favours selection of a preferred way for a given set, and hence is more likely to select a victim cache entry in the same way for subsequent evictions in a given set. This is in contrast to techniques which may select different ways for the same set in different evictions, for example by selecting a random one of the highest victim priority cache entries each time. By selecting the victim cache entry favouring a preferred way, the set-specific selection criterion can support better performance in certain workloads. For example, in a streaming workload, newly allocated cache entries may be unlikely to be reused and hence less useful than entries existing in the cache. In such workloads, selecting the victim cache entry favouring a preferred way may reduce the likelihood of cache pollution arising from replacing useful existing cache entries with less useful newly allocated cache entries, which may be more likely when selecting to evict data from cache entries in different ways in subsequent evictions.

The preferred way differs between at least two sets. Hence, rather than the victim cache entry being in the same way for each set, the set-specific selection criterion favours selection of victim cache entries belonging to different ways in different sets. This means that accesses in different sets of the cache are more likely to access different ways, which can enable improved performance by reducing the likelihood of conflicts between accesses.

There may be several approaches for implementing the set-specific selection criterion. In some examples, the cache replacement control circuitry may be configured to select the preferred way in dependence on a set index of the given set. The set index, which may be used to identify which set is used for storing data at a particular address, may be fixed for a particular set and differs between sets. Hence, if the preferred way is selected in dependence on the set index then the preferred way may remain the same for a given set, whilst differing between sets. The set index may be used in a variety of ways to identify the preferred way. For example, a portion of the set index (e.g., a least significant portion) could be used to select between the N ways to identify the preferred way.

In some examples, the cache replacement control circuitry may be configured to select the preferred way for the given set in dependence on a hash of the set index. That is, a portion of the set index may be used as an input in a hash function, with the output of the hash function used to identify the preferred way. Using a hash function to select the preferred way based on the set index may provide greater variation in the selected way for neighbouring sets (compared to, for example, using the set index directly), and may reduce the likelihood of the preferred way repeating regularly within the cache, which can reduce the likelihood of cache conflicts. For example, certain workloads may access addresses mapped to cache sets at regular intervals such that cache lookups access regularly spaced cache sets. Preventing regularly spaced cache sets from having a victim cache entry in the same way can reduce the likelihood of conflicts between accesses in said workloads.

In some examples, the set associative cache may be an N-way set associative cache, and the cache replacement control circuitry may be configured to select the preferred way for the given set in dependence on more than log 2(N) bits of the set index. log 2(N) bits of a binary number are sufficient to distinguish between N ways, and hence one might think that use of log 2(N) bits of the set index are sufficient to select the preferred way in each set. However, the inventor has realised that log 2(N) bits of the set index may repeat regularly within the cache (e.g., the bottom log 2(N) bits of the set index may repeat with a frequency of N sets, meaning that the least significant log 2(N) bit portion of the set index for set A may be the same as the same log 2(N) bit portion of the set index for set A+N), and hence the preferred way may repeat regularly for regularly spaced sets of the cache. This may cause cache conflicts in workloads which cause accesses to cache sets at regularly spaced intervals (e.g., stride accesses may cause cache accesses in regularly spaced sets of the cache). However, using more than log 2(N) bits of the set index can greatly reduce the regularity with which the preferred way is selected for successive sets within the cache, and can hence enable improve performance. Whilst the input to the hash function may comprise more than log 2(N) bits of the set index, it will be appreciated that the output of the hash function may still be log 2(N) bits.

In some examples, when a preferred cache entry belonging to the preferred way has the cache replacement selection value indicative of the equal highest priority to be selected as the victim cache entry, the cache replacement control circuitry is configured to select the preferred cache entry as the victim cache entry. Hence, the set-specific selection criterion favours selection of a victim cache entry belonging to the preferred way.

There is no guarantee that the preferred way will include a victim cache entry having the highest priority for selection as the victim cache entry. When the cache entry belonging to the preferred way does not have the cache replacement selection value indicative of the equal highest priority to be selected as the victim cache entry, then the cache entry in the preferred way may not be selected as the victim cache entry. In this situation, the cache replacement control circuitry may be configured to select the victim cache entry using one of a variety of techniques. However, the cache replacement control circuitry still favours selection of the victim cache entry based on the preferred way, as overall the probability of the preferred way being selected is higher than the probability of selecting another way.

In some examples, when a preferred cache entry belonging to the preferred way does not have the cache replacement selection value indicative of the equal highest priority to be selected as the victim cache entry, the victim cache entry may be selected to be the next cache entry, in a predefined order starting from the preferred way, which does have the cache replacement selection value indicative of the equal highest priority. The predefined order may be the same for every set, and may for example correspond to (an arbitrary) way numbering (e.g., the next highest or next lowest way having the highest priority cache replacement selection value may be selected as the victim cache entry). By selecting the victim cache entry in a way selected following a predetermined order starting from the preferred way, the preferred way is favoured, and a victim cache entry is selected in a way which is more likely to differ between sets.

In some examples, the set associative cache comprises at least two way banks of one or more ways, each way bank being separately accessible via separate access ports. Due to having separate access ports, each way bank (of one or more ways) may be separately accessible in parallel. For example, some examples may comprise cache access circuitry configured to perform a first cache access in a first way bank in parallel with a second cache access in a second way bank. Therefore, this is one implementation in which it may be preferable for cache accesses to seek data in different cache ways, and hence an example in which performance may be improved by using a set-specific selection criterion as discussed above to perform cache replacement favouring different ways for different sets.

In some examples, the first cache access may be a lookup access to determine whether the first way bank contains a given cache entry. In some examples, the second cache access may also be a lookup access to determine whether the second way bank contains the given cache entry. In some examples, all of the way banks may be looked up to determine for each way bank if that way bank contains the given cache entry. When performing a lookup it is generally not known in advance which, if any, way stores the given cache entry and hence the cache access circuitry may be configured to perform cache lookups in each of the way banks.

In some examples, one of the first and second cache accesses may be an allocation access to allocate a cache entry in a way bank. Allocation accesses typically target a particular way bank (e.g., to write data to the previously evicted victim cache entry), and hence it may be known in advance which way bank will need to be accessed for an allocation access. An allocation access to a particular way bank, such as the second way bank, may therefore be performed in parallel with a cache lookup in the other way banks, including for example the first way bank. A cache allocation may therefore be performed in a particular way bank, with the remainder of the way banks being used for a cache lookup (although one or more of the remaining way banks may alternatively be used in a different cache access).

For performance of a cache lookup in parallel with an allocation to be useful, it would be desirable for the cache entry requested in the lookup to belong to a different way bank to the allocation entry. A set-specific selection criterion as discussed above can decrease the likelihood that many allocations target the same cache way (and hence also increases the likelihood that cache lookups will hit in different way banks), making it more likely both can complete in parallel, and can therefore enable improved performance.

It will be appreciated that similar improvements may be observed with cache allocations being performed in parallel to different way banks, and indeed to cache lookups targeting different cache entries being performed in different way banks (e.g. if way prediction is supported, allowing a prediction of which way a cache lookup hits in, then cache lookups predicted to hit in different way banks could be scheduled in parallel).

In some examples, if a first cache access has missed in the first way bank (and the other way banks are not also being looked up for the same cache entry in that cycle and have not already been looked up in a previous cycle) then the cache access circuitry may be configured to replay the lookup access. The lookup may be replayed for example in all way banks, or may be replayed in a specific subset of way banks. It may for example be the case that lookups in several way banks missed, but a lookup has not been performed in a particular way bank because that way bank was being accessed for an allocation during the previous cache lookups (i.e., there was a conflict). Hence, the lookup may be replayed so that all way banks may be looked up. Performance may be improved by reducing the likelihood of having to replay the cache lookup, by making it more likely for the allocation access and the lookup access to not be conflicting accesses, and for the lookup access to hit in a different way to the allocation access. Hence performance may be improved by selecting a victim cache entry using a set-specific selection criterion which favours eviction from different ways for different sets.

In some examples, when the set associative cache is being accessed in a streaming mode, the cache replacement control circuitry may be configured to allocate the new cache entry in association with a streaming allocation cache replacement selection value, wherein the streaming allocation cache replacement selection value indicates a higher priority for selection of the new cache entry as the victim cache entry than a non-streaming allocation cache replacement selection value.

A streaming mode may be used for streaming workloads in which memory locations are accessed with very little reuse. Examples of streaming workloads may include, for example, memcpy in which data is moved from a first location in memory to a second location in memory (and hence each memory location is only accessed once). Hence, cache entries allocated in a streaming workload may be unlikely to be accessed again before they are evicted. To reduce the likelihood of cache entries allocated in streaming mode from causing eviction of previously allocated cache entries (which may be more likely to be reused), new cache entries allocated in the streaming mode may be allocated with a cache replacement selection value biased towards a higher priority of that entry being selected for eviction than entries allocated out of the streaming mode. In a streaming mode there may therefore be several entries allocated into sets having cache replacement selection value indicating a high priority for eviction, and therefore the problem discussed above in which the same way is selected for eviction over several sets may arise in the context of a streaming workload, causing increased risk of bank conflicts where accesses cannot be parallelised because they all target the same way bank. The solution of using a set-specific selection criterion may therefore enable improved performance particularly in systems using a streaming allocation cache replacement selection value, by distributing allocations over a wider range of ways, reducing the risk of bank conflicts and hence increasing the efficiency with which accesses can be scheduled in parallel.

In some examples, the cache replacement control circuitry may configured to identify that the set associative cache is being accessed in a streaming mode. This could for example be determined based on a software controlled setting which may indicate when a streaming mode is being entered. In some examples, the cache replacement control circuitry may be configured to identify that the set associative cache is being accessed in a streaming mode based on monitoring re-use of at least a subset of the plurality of cache entries. As low reuse of cache entries may be indicative of a streaming workload, the cache replacement control circuitry may identify that the cache is being accessed in a streaming workload when cache hit rates are low for the subset of cache entries.

In some examples the monitored subset of the plurality of cache entries may be a proper subset excluding at least some of the cache entries. For example, the subset may comprise a leader set of cache entries to be monitored for re-use. In some examples the leader set may use a fixed scheme for controlling cache eviction (and hence entries in the leader set may be allocated with a fixed cache replacement selection value regardless of whether the cache is being accessed in a streaming mode), and the performance of the leader set may be used to determine which allocation scheme to use for the rest of the sets. For example, if entries in the leader set are allocated with a non-streaming mode cache replacement selection value and the hit rate (indicative of re-use) is low, then it may be identified that the cache is being accessed in a streaming mode and new cache entries in the rest of the cache should be allocated with a streaming mode cache replacement selection value. If the hit rate in the leader set later increases, it may be determined that the cache is no longer being accessed in a streaming mode and new cache entries may be allocated with a non-streaming mode cache replacement selection value.

It will be appreciated that the set associative cache may be one of several different types of cache, and that the techniques discussed herein may provide improved performance across several cache types. In some examples, the set associative cache may be a data cache, where the above cache conflict issues may be particularly prevalent. In some examples, the set associative cache may be a level one data cache.

Particular examples will now be described with reference to the Figures.

FIG. 1 schematically illustrates an example of a data processing apparatus 2. The data processing apparatus has a processing pipeline 4 which includes a number of pipeline stages. In this example, the pipeline stages include a fetch stage 6 for fetching instructions from an instruction cache 8; a decode stage 10 for decoding the fetched program instructions to generate micro-operations (decoded instructions) to be processed by remaining stages of the pipeline; an issue stage 12 for checking whether operands required for the micro-operations are available in a register file 14 and issuing micro-operations for execution once the required operands for a given micro-operation are available; an execute stage 16 for executing data processing operations corresponding to the micro-operations, by processing operands read from the register file 14 to generate result values; and a writeback stage 18 for writing the results of the processing back to the register file 14. It will be appreciated that this is merely one example of possible pipeline architecture, and other systems may have additional stages or a different configuration of stages. For example in an out-of-order processor an additional register renaming stage could be included for mapping architectural registers specified by program instructions or micro-operations to physical register specifiers identifying physical registers in the register file 14. In some examples, there may be a one-to-one relationship between program instructions decoded by the decode stage 10 and the corresponding micro-operations processed by the execute stage. It is also possible for there to be a one-to-many or many-to-one relationship between program instructions and micro-operations, so that, for example, a single program instruction may be split into two or more micro-operations, or two or more program instructions may be fused to be processed as a single micro-operation.

The execute stage 16 includes a number of processing units, for executing different classes of processing operation. For example the execution units may include an arithmetic/logic unit (ALU) 20 for performing arithmetic or logical operations; a floating-point unit 22 for performing operations on floating-point values, a branch unit 24 for evaluating the outcome of branch operations and adjusting the program counter which represents the current point of execution accordingly; and a load/store unit 28 for performing load/store operations to access data in a memory system 30, 32, 34.

In this example the memory system include a level one data cache 30, the level one instruction cache 8, a shared level two cache 32 and main system memory 34. It will be appreciated that this is just one example of a possible memory hierarchy and other arrangements of caches can be provided. The specific types of processing unit 20 to 28 shown in the execute stage 16 are just one example, and other implementations may have a different set of processing units or could include multiple instances of the same type of processing unit so that multiple micro-operations of the same type can be handled in parallel. It will be appreciated that FIG. 1 is merely a simplified representation of some components of a possible processor pipeline architecture, and the processor may include many other elements not illustrated for conciseness, such as branch prediction mechanisms or address translation or memory management mechanisms.

Figure 2:
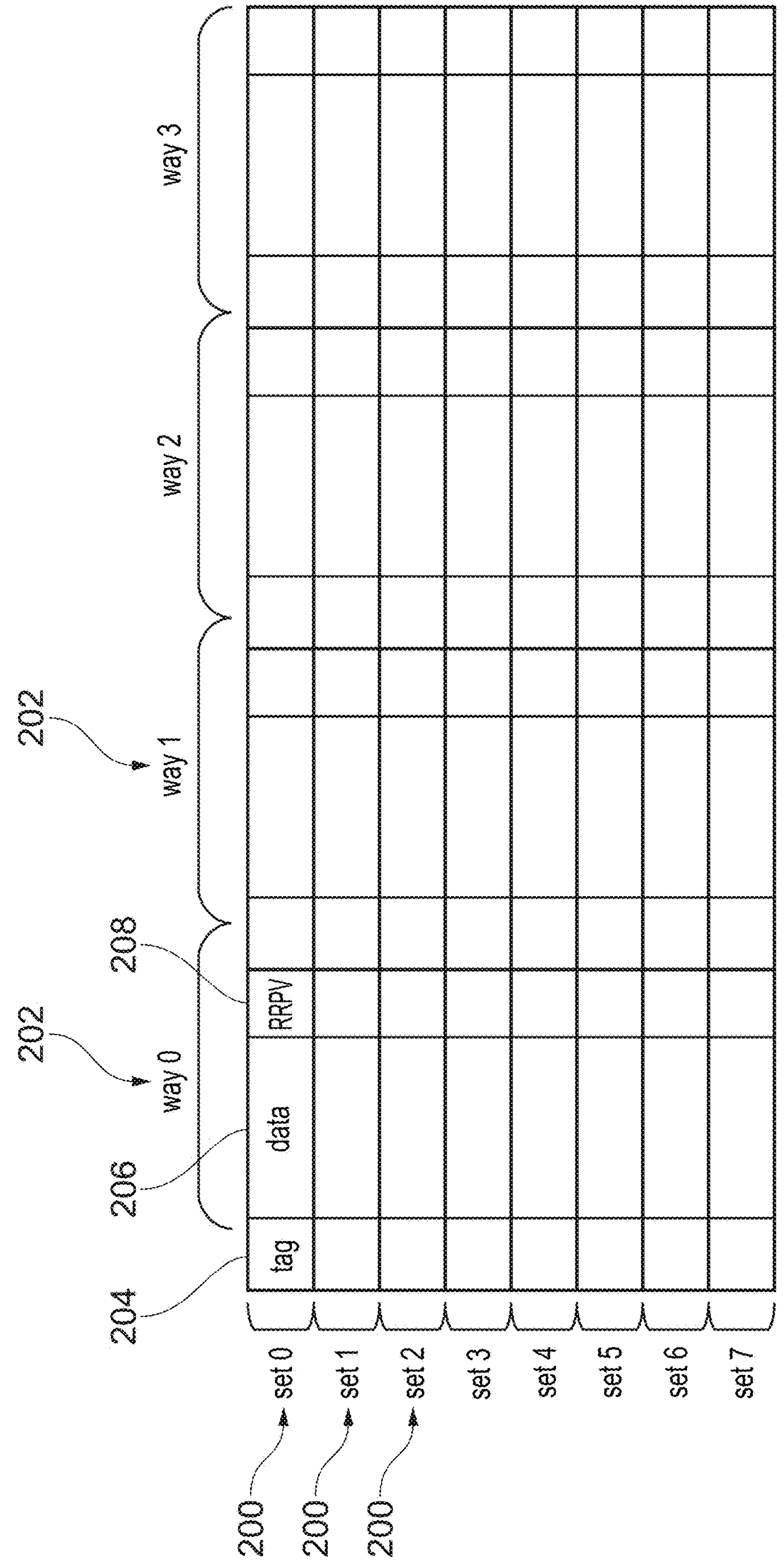
FIG. 2 schematically illustrates a logical arrangement of a set-associative cache.

FIG. 2 schematically illustrates a logical arrangement of a set-associative cache comprising a number of sets 200 of cache entries. For a cache having associativity N, this means that the number of entries in one set 200 is N. Such a cache can be described as an "N-way" set-associative cache and the entries can also be considered to be logically grouped into "ways" 202, where each set 200 comprises one entry from each way 202. The set associative cache illustrated in FIG. 2 is a 4-way set associative cache having 8 sets 200, each comprising cache entries in 4 ways 202, although it will be appreciated that both of these values are chosen merely as an example, and the techniques discussed herein are applicable to caches having different numbers of ways and sets. A cache entry is illustrated in set 0 and way 0 of the cache shown in FIG. 2, the cache entry having a tag field 204, data field 206, and re-reference prediction value (RRPV) field 208.

The set-associative allocation policy used for such a cache means that when data having a given address needs to be allocated into the cache, it is placed in one of the entries within a particular set 200 that is selected based on an index value computed based on the given address. In some cases the set for a particular memory access may be chosen by determining an index value to be a portion of bits extracted from the given address, while in other examples the index could be based on a more complicated function of the given address (e.g. applying a hash function to the given address to obtain the index value). Hence, data associated with a given address cannot be stored in entries of sets 200 other than the set corresponding to the index selected based on the given address. This is useful because it reduces the number of entries of the cache which have to be checked to determine whether the cache stores data associated with a specified target address, but in comparison to a direct-mapped cache (where data for a given address can only be allocated to a single entry selected based on the address), the set-associative scheme improves performance as there is flexibility to allocate data for a given address to two or more locations, which reduces the likelihood of thrashing as it means two or more different addresses mapping to the same set can each be cached simultaneously.

Each entry may specify a cache tag value 204 and a data value 206. The data value 206 is the information of interest which is stored in the corresponding cache entry. The data value could be data or instructions, or could be address mapping information cached in a translation lookaside buffer, for example. The tag 204 corresponds to a portion of the target address which is not used to generate the index (or which otherwise distinguishes addresses mapping to the same set), and can be stored alongside the cached data 206 to allow the different addresses which map to the same index to be distinguished from each other when looking up in the cache. That is, data associated with a target address may be stored in any of the ways within a particular set, and the tag value 204 enables the way storing data associated with the target address to be identified. The tag value 204 may be stored in the same physical structure as the data 206 (as shown in FIG. 2), but in some examples the tag values may be provided in a separate structure. Each entry may also store replacement policy information 208 for selecting a victim cache entry when an entry needs to be evicted from the cache. Although not shown in FIG. 2, each entry may also store state information associated with the corresponding address, such as a valid indicator indicating whether the data in the corresponding entry is valid, coherency state information (e.g. a dirty bit indicating whether the data value 206 has been modified compared to the corresponding data value in a higher level cache (e.g. L2 or L3 cache) or memory).

Hence, on a cache access to check whether data associated with a target address is stored in the cache, the index value derived from the target address is used to select a set 200 and each of the tag values 204 in the entries within the selected set 200 are compared with the tag portion of the target address. If any of the tag values 204 match the tag portion of the target address then the corresponding cache entry having the matching tag 204 stores the data for the requested target address, and that entry can be used depending on the type of access being performed. The scenario when one of the tags 204 in the indexed set 200 matches the tag of the target address is called a cache hit.

On the other hand, if none of the tags 204 in the indexed set 200 match the tag of the target address, then this is known as a cache miss, and in this case the information associated with the target address may need to be fetched from a further data store, such as a further level of cache or main memory. If one of the indexed set of caches is invalid, then the invalid entry can be selected for allocating the new data associated with a target address. However, if all of the indexed set of entries are already filled with valid data then one entry of the indexed set 200 can be selected as a victim entry for which the data 206 is to be evicted from the cache to make way for the new information associated with the target address.

The RRPVs 208 (where an RRPV is an example of a cache replacement selection value) may be used to decide which cache entry to select as the victim cache entry for eviction. In some examples, the RRPVs may be stored in a separate array of cache entries to the array of data entries 206, such as the same array used to store the tag values 204 or another structure altogether (meaning that no update is required to the tag array on a hit), although in the example of FIG. 2 the RRPVs are stored in the same array as the data values 206 and tag values 204. When a cache replacement is made, the victim entry is selected from among a set of candidate cache entries based on the RRPVs of the candidate cache entries. In general, the cache replacement policy may choose the victim so that it is more likely that a candidate cache entry with an RRPV indicating a higher priority for eviction is selected as the victim cache entry than a candidate cache entry with an RRPV indicating a lower priority for eviction. In some examples, a victim entry may be selected for eviction and re-allocation if at least one of the candidate entries has an RRPV indicating a priority for eviction higher than a certain threshold. It will be appreciated that the numerical value indicating a highest priority for eviction may be either a high numerical value or a low numerical value, and hence in different examples this may involve selecting the highest or lowest RRPV.

The RRPV is set based on a prediction of the re-reference interval (distance to the next access to the cached information), so that an RRPV may indicate how likely it is that a particular cache entry will be re-used in future. Different variants of RRPV replacement policies may have different rules for setting the RRPV on a new allocation of a new entry and when a hit to an existing entry is detected.

When a replacement is made, and a given cache entry is allocated as a new cache entry for storing the newly allocated information corresponding to a particular address, the RRPV for that entry is initialised to a particular initial value. The initial value may vary depending on a particular cache replacement policy. For example, for an LRU (least recently used) implementation of the re-reference interval prediction (RRIP) policy, the initial value may be the value indicating the lowest priority for eviction (e.g. RRPV=0). For an implementation of RRIP targeting streaming access patterns (which, in a stream of addresses accessed in sequence, are relatively unlikely to require the same address more than once), or thrashing access patterns (which show some temporal locality, but with a working set larger than the cache capacity), it can be better to use an initial RRPV which has a higher priority for eviction.

Following a miss in a cache lookup, cache replacement control circuitry may update the RRPVs for each candidate entry looked up in the lookup to advance the RRPVs to the next highest priority for eviction. On a hit in the cache lookup for a given address, the RRPV for the hit entry can be modified in different ways, but may generally be updated to indicate a lower priority for eviction. In a "hit priority" (HP) scheme, regardless of the current RRPV of the hit entry, that entry's RRPV is updated to indicate a predetermined value, e.g. the lowest priority for eviction (such as RRPV=0). This approach will tend to favour for retention the cache the most recently accessed addresses. In contrast, if a "frequency priority" (FP) scheme is used, then the RRPV of the hit entry may be updated to indicate the next lowest priority for eviction after the priority indicated by the current RRPV of the hit entry. The FP scheme tends to favour retention in the cache the addresses which are accessed frequently, even if not accessed as recently as another address which was accessed less frequently.

Whilst the RRPV is a particular implementation of a cache replacement selection value has been described above, it will be appreciated that this is merely an example. In other examples, a cache replacement selection value may be initialised in different ways and, if updated at all, may be updated in response to triggers other than a cache lookup. However, it is generally the case that cache replacement selection values can be used to indicate a relative priority for selecting a victim cache entry.

When there are several cache entries in a candidate set of cache entries (e.g., each of the cache entries in a given set) having the same highest RRPV, then generally some criterion has to be used to identify which of those equal highest victim priority cache entries should be selected as the victim cache entry.

Figure 4:
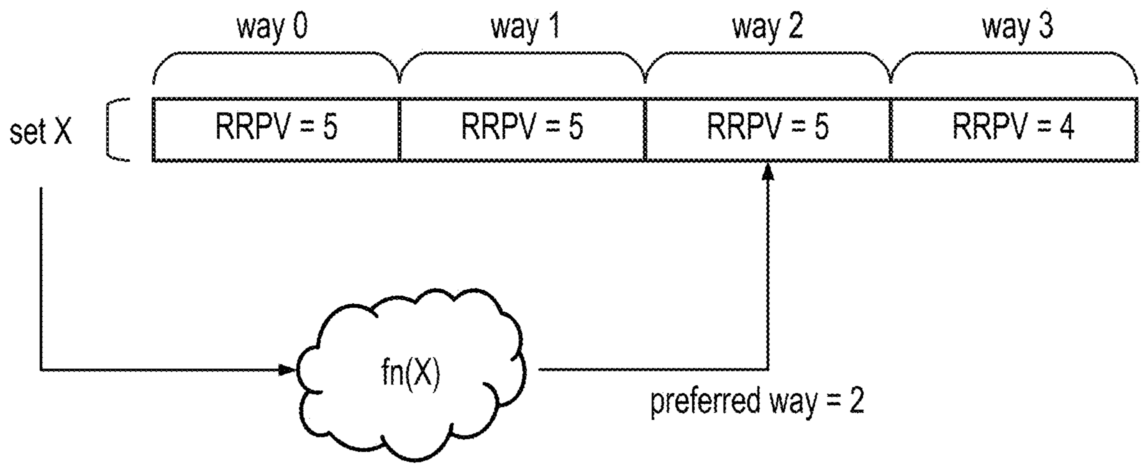
FIGS. 4 and 5 provide examples of selecting a victim cache entry using a set-specific selection criterion.
Figure 5:
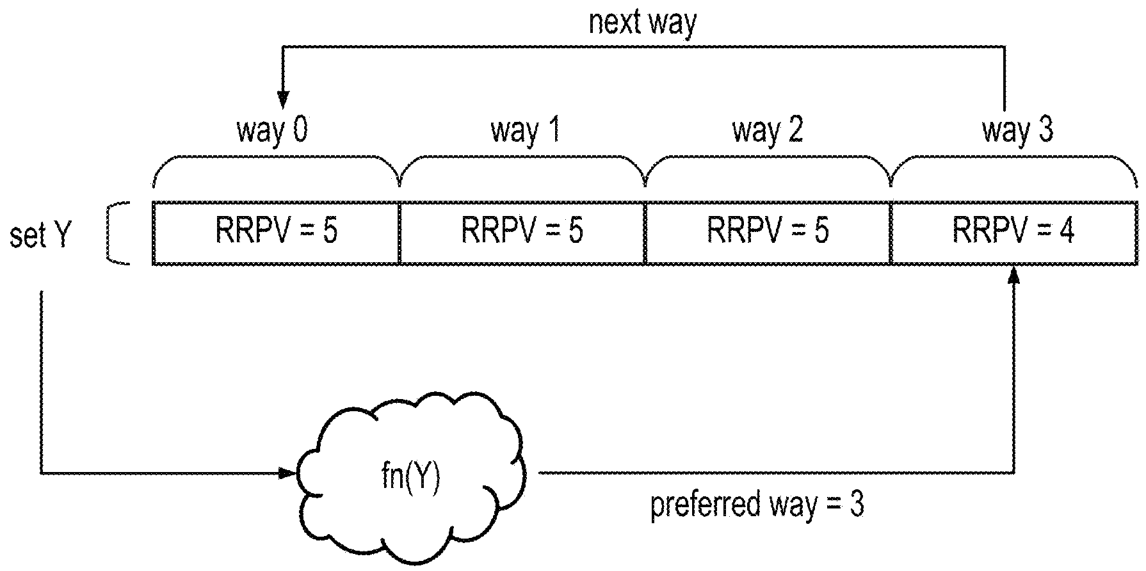

In examples of the present technique, the victim cache entry is selected using a set-specific selection criterion. The set-specific selection criterion favours selection of a victim cache entry belonging to a preferred way for a given set, where the preferred way differs between sets. For example, the set index associated with each set 200 may be used to determine a preferred way for that set (e.g., by performing a hash function on the set index), and the victim cache entry may be selected based on the preferred way. FIGS. 4 and 5 discussed below provide examples for selecting a victim cache entry for eviction based on a preferred way.

The use of the set-specific selection criterion favours eviction of data from the same way in a given set. This can reduce the likelihood of cache pollution. For example, in a streaming workload where entries are allocated having a high priority for eviction, selecting the same way in a given set increases the likelihood of selecting a cache entry allocated as part of the streaming workload, rather than selecting a cache entry allocated outside of the streaming workload and which may be more likely to be re-used in the future. Hence, the use of the preferred way may improve performance compared to other techniques such as randomly selecting one of the highest priority cache entries.

The use of the set-specific selection criterion may be used for many workloads (e.g., it may be used as the standard method for selecting which cache entry to evict). Whilst enabling performance improvements in certain workloads such as a streaming workload, the set-specific selection criterion may not harm performance in other workloads. For example, in a workload with higher reuse, new cache entries may be allocated to the cache with low RRPVs indicative of a lower priority to be selected for eviction. In these workloads, there may be a smaller number of entries having the highest RRPV, and these entries may be distributed more evenly across different ways for different sets, naturally reducing the likelihood of bank conflicts. As it may be less likely to have a plurality of equal highest priority cache entries in these workloads, using the set-specific selection criterion may have a minimal effect of performance on these workloads and hence may not be harmful to performance. Nevertheless, the set-specific selection criterion is beneficial for other workloads (e.g. streaming workloads such as memcopy operations), so on average across all workloads there may be a performance improvement when this set-specific selection criterion is applied.

Figure 3:
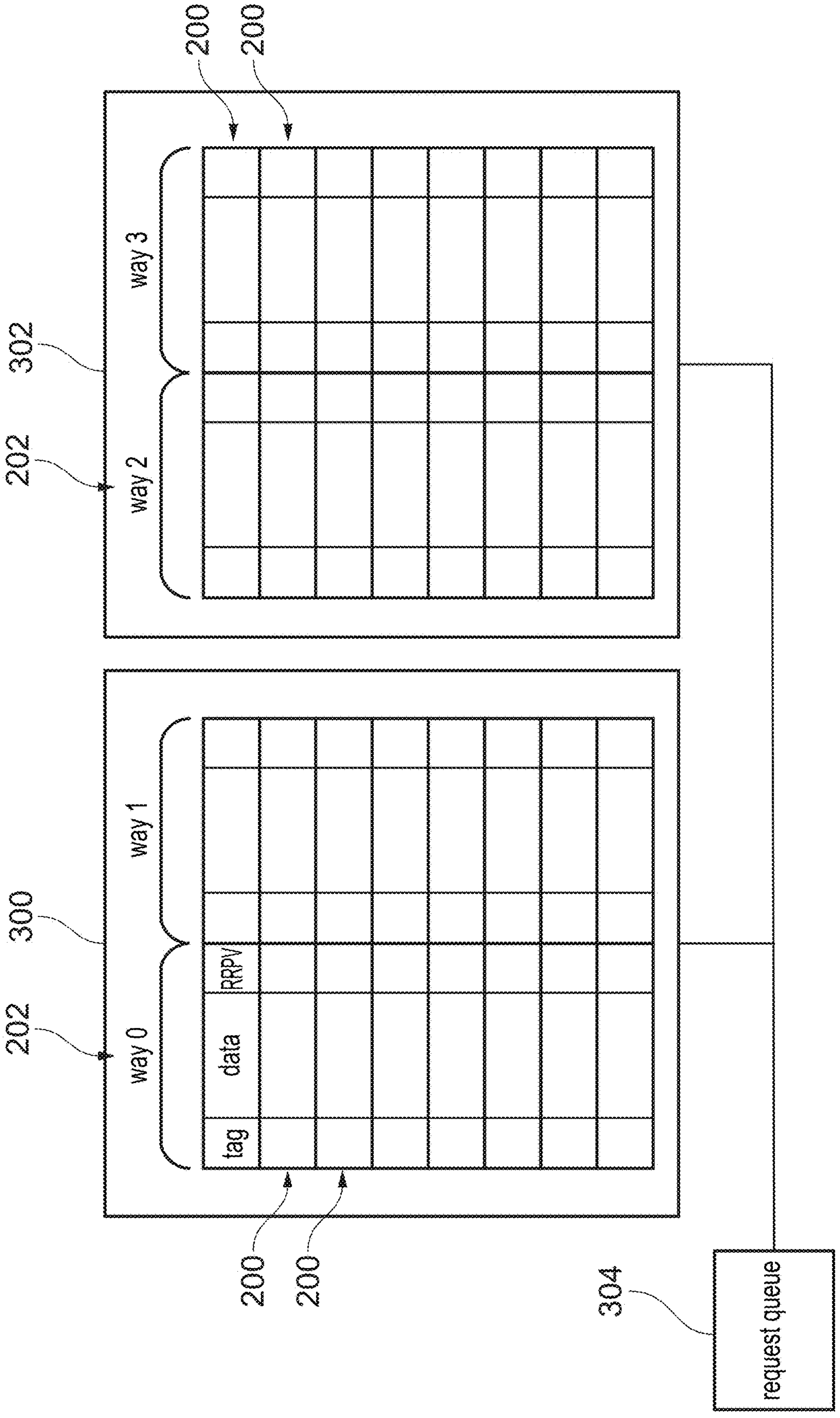
FIG. 3 schematically illustrates a set-associative cache implemented as two banks of ways.

The use of the set-specific selection criterion also favours eviction of data from different ways for different sets. This can enable increased performance by reducing the likelihood of conflicts between parallel cache accesses, where a conflict arises when cache entries to be accessed in parallel cache accesses are located in the same cache way. FIG. 3 illustrates a cache arrangement in which cache accesses targeting different ways may enable improved performance.

FIG. 3 schematically illustrates a set-associative cache (as shown in FIG. 2) implemented as two banks of ways. A first way bank 300 comprises way 0 and way 1, while a second way bank 302 comprises way 2 and way 3. Each way bank 300, 302 has a different access port meaning that cache access requests from a request queue 304 may be handled in parallel by the first way bank 300 and the second way bank 302. It will be appreciated that while shown as two banks of two ways each, a different number of banks may be provided each comprising one or more ways (where the number of ways may differ between banks). Because each way bank can be accessed separately, two cache accesses may complete in parallel if the way to be accessed is in a different bank.

For example, a cache allocation in the first way bank 300 may be completed in parallel with a cache allocation in the second way bank 302. Similarly, a cache lookup for which the target data is stored in the first way bank 300 may be completed in parallel with a cache allocation targeting the second way bank 302. In contrast, two cache accesses requiring access to the same way bank (even in different sets) may be conflicting accesses which may be unable to be performed in parallel. Therefore, in cases where multiple cache entries in the set for which a cache miss is detected all have equal highest RRPV values, it may be preferable for cache replacement control circuitry to select a victim cache entry for different sets in different cache ways to increase the likelihood that subsequent cache accesses for those sets have target data in different way banks, to allow those subsequent cache accesses to be performed in parallel.

FIGS. 4 and 5 provide examples of selecting a victim cache entry using the set-specific selection criterion. FIGS. 4 and 5 illustrate a single set in a 4-way set-associative cache such as the cache shown in FIGS. 2 and 3. As illustrated in FIGS. 4 and 5, a set index associated with a particular set may be used as an input in a hash function for identifying the preferred way for that set.

In FIG. 4, the index of set X is used as an input in a function, the output of which identifies that way 2 is the preferred way for set X. The preferred way for set X will be the same way, way 2, when selecting a victim cache entry for subsequent cache allocations (because the same function and same input may be used). In FIG. 4, the equal highest RRPV is RRPV=5 (this being the RRPV for the entries in ways 0, 1, and 2). As the preferred way is way 2, which contains an entry having the equal highest RRPV, then the cache entry in way 2 is selected as the victim cache entry in the example of FIG. 4.

In FIG. 5, the index of set Y is used as the input in the function, and the preferred way is identified as way 3. Therefore, the preferred way is different for sets X and Y. In FIG. 5, the preferred way does not contain an entry having the equal highest RRPV. Therefore, the cache entry in the next way in some predetermined order starting from the preferred way is selected as the victim cache entry. In the example of FIG. 5 the predetermined order follows increasing values of the way labels (e.g., way 3 is followed by way 0, then way 1, then way 2) although it will be appreciated than any predetermined order could be used, where the predetermined order may be the same or may vary between different sets. The next way in the predetermined order of FIG. 5 is way 0 (having RRPV=5), and hence the cache entry in way 0 is selected as the victim cache entry.

Hence, the victim cache entry is in way 2 for set X and way 0 for set Y. In contrast, if the first entry in an increasing order starting from way 0 were used to select the victim cache entry for both sets X and Y, then the cache entry in way 0 would be selected as the victim cache entry for both sets X and Y. Accesses to allocate data to the victim cache entry would conflict if the victim cache entry for both sets were in way 0, whereas use of the set-specific selection criterion shown in FIGS. 4 and 5 means that these cache accesses would not conflict. It is noted that use of the set-specific selection criterion does not guarantee that accesses do not conflict, however on average the probability of conflict may be reduced through use of the set-specific selection criterion, enabling average performance to be improved.

If new data is allocated into set X with RRPV=5 (e.g., in streaming mode where data allocated has a high priority for eviction), then way 2 will also be selected as the next victim cache entry for set X. Hence, use of the set-specific selection criterion means that the same way may be selected for successive cache evictions from the same set, whilst enabling different ways to be selected for different sets.

FIGS. 4 and 5 provide an example in which the whole set index (X or Y) is used in the hash function to determine the preferred way for each set. However, a portion of the set index may be used instead. A least significant bit portion of the set index may be selected, as this may vary more frequently than a more significant portion of the set index between neighbouring sets. The portion of the set index may comprise more than log 2(N) bits of the set index for an N-way set associative cache, to reduce the likelihood that the way selected as the preferred way repeats regularly throughout a cache.

For example, the hash function may be implemented as an operation which combines a number of input bits to provide each output bit. In one example, groups of bits of the set index may be combined with an operation, such as an exclusive or (XOR), to provide output bits (e.g., log 2(N) output bits) to select the preferred way. For example, for a 4 way cache, the preferred way may be selected using a log 2(4)=2 bit value. If the 4 way cache is accessed using an 8 bit set index (for example), then the hash function could be implemented by XORing two groups of set index bits to provide a 2-bit value indicating the preferred way (e.g., bit[7]^bit[5]^bit[3]^bit[1] and bit[6]^bit[4]^bit[2]^bit[0]). It will be appreciated that the XOR operation is merely an example, and also that certain bits of the set index may not be used as inputs to the hash function.

Stride memory access patterns may access memory addresses separated by regular intervals. The selected set for a cache access depends on a portion of the address of a memory access request meaning that regularly spaced memory addresses may map onto regularly spaced sets. Stride access patterns may therefore lead to cache accesses to sets spaced regularly within a cache. Hashing of the set index, and the use of more than log 2(N) bits of the set index, to select the preferred way can reduce the likelihood that the preferred way is the same for sets separated by regular intervals. Hence, this can reduce the likelihood of cache conflicts between cache access requests issued during a workload having a stride access pattern.

Figure 6:
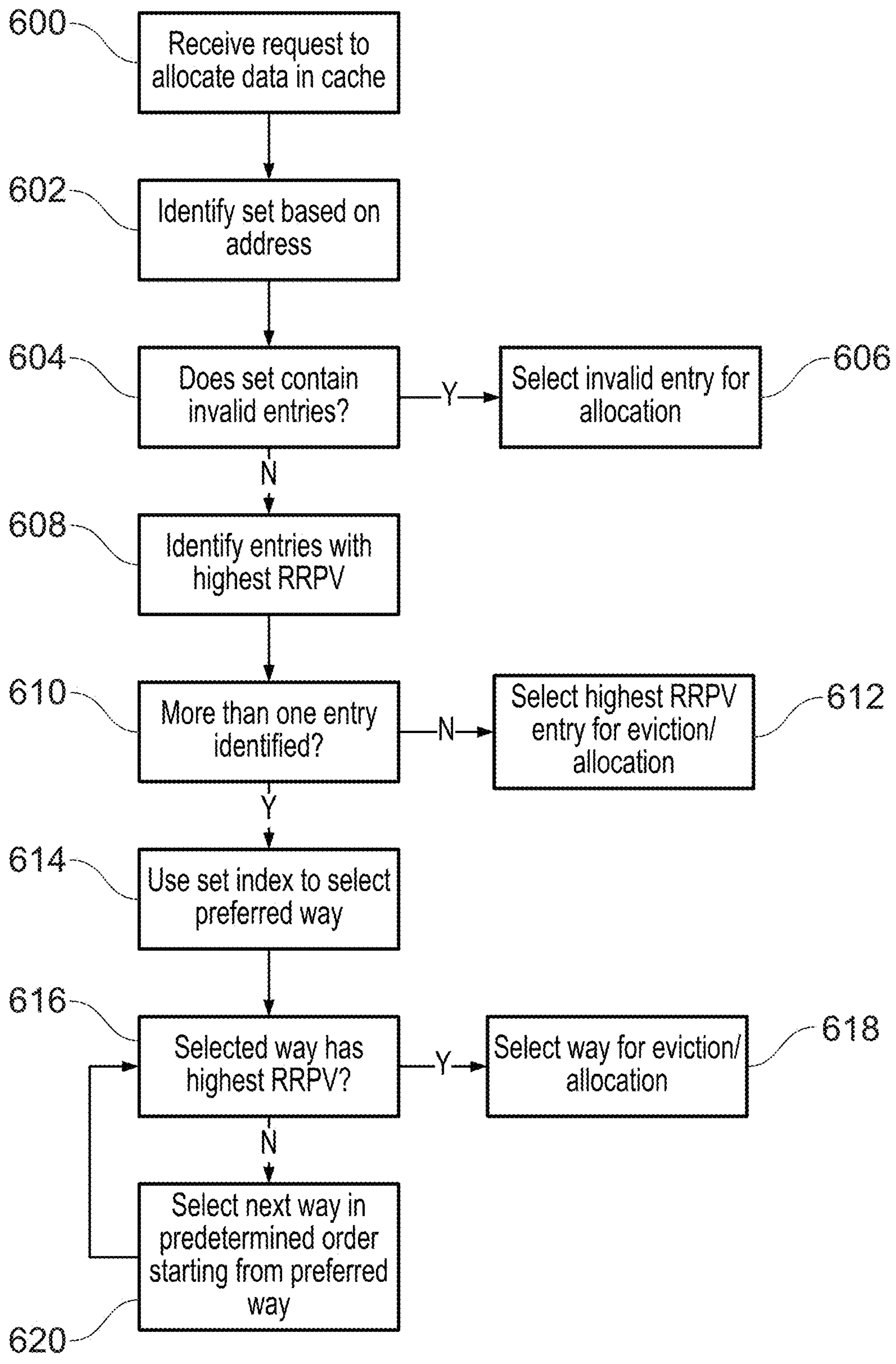
FIG. 6 is a flow diagram illustrating a method for selecting a victim cache entry in a set associative cache.

FIG. 6 is a flow diagram illustrating a method for selecting a victim cache entry in a set associative cache. At step 600, a request to allocate data in the cache is received by cache replacement control circuitry. For example, the request received at step 600 may be issued in response to a cache miss in the cache for target data associated with a particular target address, with the request at step 600 for allocating the target data in the cache from a lower level of cache or memory.

At step 602, the cache replacement control circuitry identifies a set for allocating the target data based on the target address associated with that data. A set index is computed based on the target address to identify the target set for allocation of the target data.

At step 604, it is determined whether the target set contains any invalid cache entries in any of the ways in that set. If so, then at step 606 an invalid cache entry is selected for allocating the target data. In this case, no selection of a victim cache entry is required because the target set had sufficient space to accommodate the new entry without evicting an existing entry.

If at step 604 it is determined that there are no invalid entries in the target set, then a victim cache entry needs to be identified for replacement. At step 608, the cache replacement control circuitry identifies the one or more cache entries having the highest cache replacement selection values (RRPVs).

At step 610 it is determined whether step 608 identified a single cache entry having the highest RRPV, and if so then at step 612 the single cache entry having the highest RRPV (the single cache entry having the highest priority for eviction) is selected for eviction and re-allocation with the target data. In some cases, this selection may be dependent on the RRPV of the single highest priority cache entry meeting a threshold for eviction, and if the threshold is not met then in some cases the target data may not be allocated in the cache.

If at step 610 it is instead determined that the target set comprises two or more cache entries having equal highest RRPVs, then the cache replacement control circuitry selects which cache entry to evict using a set-specific selection criterion. At step 614, the index of the target set is used to select a preferred way. A portion of the index (e.g., a portion larger than log 2(N) bits for an N-way set-associative cache) may for example be used as an input in a hash function, the output of which may identify the preferred way out of N ways in the target set.

At step 616 it is determined whether the cache entry in the preferred way of the target set is one of the cache entries identified at step 608 having the equal highest RRPV. If so, then at step 618 the cache entry in the preferred way is selected as the victim cache entry for eviction and re-allocation with the target data. However, if the cache entry in the preferred way is not one of the cache entries having an equal highest RRPV, then at step 620 the next cache entry in a predefined order in the target set is selected, and it is determined whether that cache entry has the equal highest RRPV. This process repeats until a cache entry is identified having the equal highest RRPV, which can then be selected for eviction and re-allocation.

Hence, the victim cache entry is selected to favour the victim cache entry being in a preferred way for each set, where the preferred way differs between sets of the cache, to reduce the likelihood of conflicts between cache accesses in caches where multiple cache entries in each set may have equal highest RRPVs.

Figure 7:
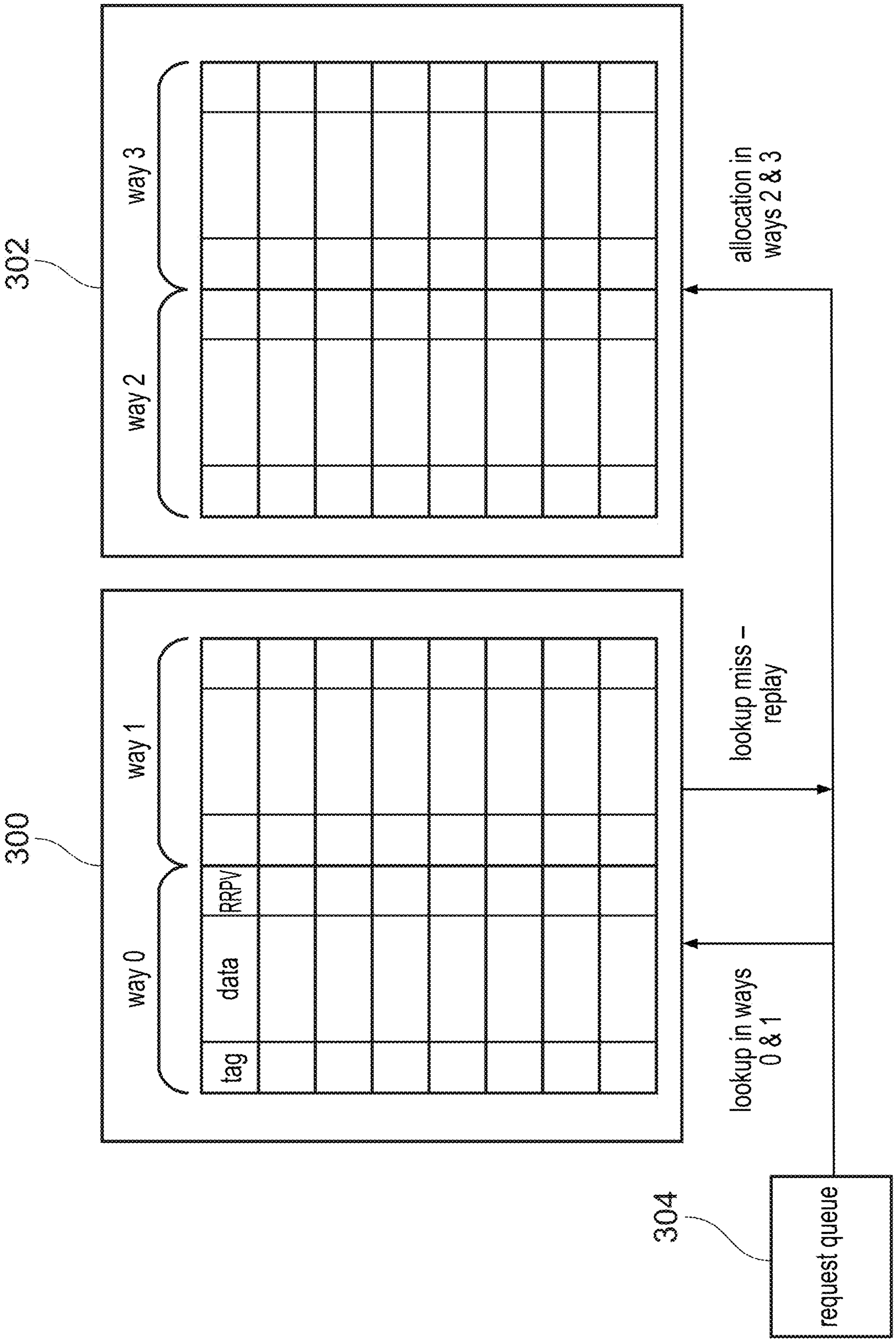
FIG. 7 schematically illustrates parallel access in a set-associative cache.

FIG. 7 schematically illustrates the set-associative cache shown in FIG. 3, further illustrating a number of cache access requests to a first way bank 300 and a second way bank 302. In particular, two parallel cache accesses are shown to be issued form the request queue 304. A first access is a cache lookup in the first way bank, and a second access is a cache allocation to the second way bank (e.g., to one of ways 2 or 3).

The request queue 304 may store a record of pending cache access requests, including cache lookup requests and cache allocation requests. The pending cache access requests may be associated with a particular priority indicating an order in which the cache accesses should be performed (e.g., the requests may be stored in a queue in which requests received earlier have priority over requests received later, such as a FIFO structure).

Cache lookups to locate target data in a cache do not generally know which way bank stores the target data. Therefore, it may be the case that cache lookups are performed in all way banks in parallel to maximise the chance of locating the target data in a given cycle and reduce the chance of a replay. Cache allocations however tend to target a particular cache entry, and hence may be performed in a particular way bank.

FIG. 7 illustrates a case in which a higher priority request (e.g., earlier in the request queue 304) is a cache allocation to the second way bank 302, followed by a cache lookup. Because the cache allocation only requires access to a single way bank, the cache lookup may be performed in parallel in the other way banks to take advantage of the possibility that the target data may be located in one of the other way banks and hence both requests could complete in parallel, and therefore FIG. 7 shows the allocation to the second way bank being performed in parallel with a lookup in the first way bank. If the lookup misses in the first way bank (ways 0 and 1), then as shown in FIG. 7 it will be replayed in a subsequent cycle. The replayed cache lookup may be performed in all way banks or specifically in the second way bank (ways 2 and 3).

The likelihood of a cache lookup replay is reduced, and hence performance is improved, if the likelihood that the target data of the cache lookup is in a different way bank to the allocated data can be increased (and hence the allocation is less likely to conflict with the lookup). The set-specific policy discussed above for selecting a victim cache entry tends to more evenly distribute cache allocations across the ways of the cache, so that it is less likely that subsequently a partial cache lookup performed in parallel with a later cache allocation will conflict with that cache allocation. Hence, the likelihood of cache conflicts is reduced, and therefore can enable improved performance.

Figure 8:
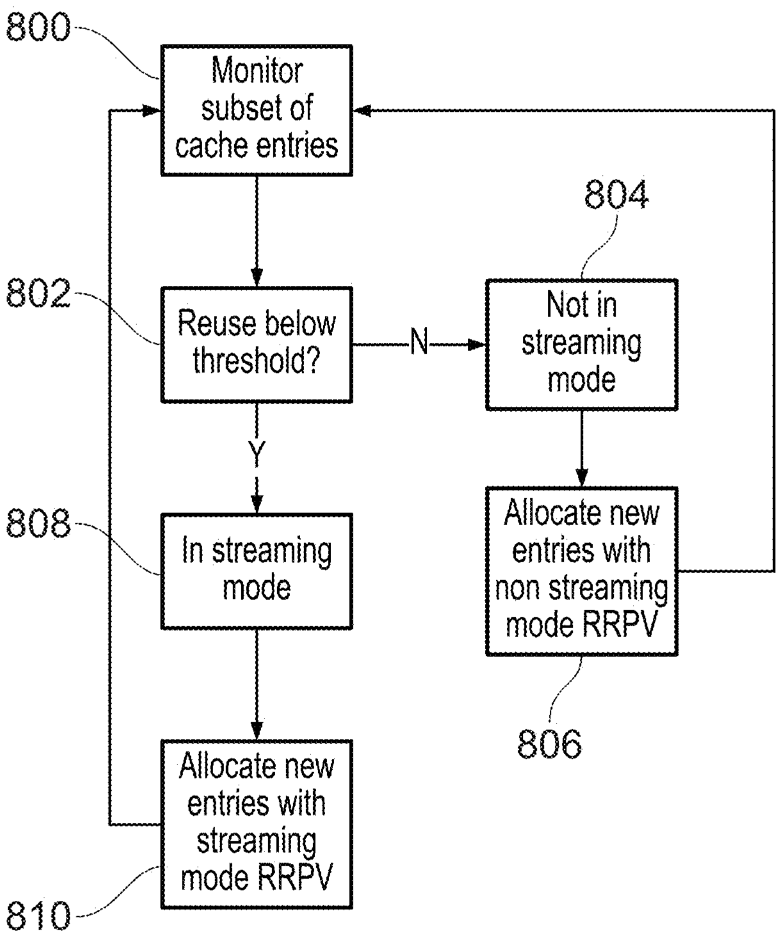
FIG. 8 is a flow diagram illustrating a method for selecting an initial RRPV when allocating cache entries in a set-associative cache.

FIG. 8 is a flow diagram illustrating a method for selecting an initial RRPV when allocating cache entries in a set-associative cache. At step 800, circuitry monitors re-use of cache entries in at least a subset of the set-associative cache. Re-use may be quantified in several ways, which in general indicate how many times a particular cache entry is hit in a lookup following that entry being allocated to the cache.

Identifying a streaming mode may be particularly relevant to the use of the set-specific selection criterion discussed above, as the streaming mode may be a workload in which the above techniques provide particular performance improvements.

If it is determined at step 802 that re-use is below a particular threshold, then at step 808 it is determined that cache replacement control circuitry for the set-associative cache should operate in a mode supporting streaming workloads. Streaming workloads may involve little reuse of data, hence having low re-use of cache entries. In streaming workloads it may be preferable for cache entries to be allocated with a high priority for eviction, because it is less likely that newly allocated cache entries are going to be re-used. Allocating with a high RRPV may reduce the chance of data allocated in the streaming mode from causing eviction of potentially useful cache entries allocated outside of the streaming workload.

Hence, when it is determined that the cache should be operated in a streaming mode, at step 810 new entries are allocated with a streaming mode RRPV. The streaming mode RRPV may indicate a higher priority for eviction than an RRPV initialised for cache entries allocated outside of the streaming mode.

If at step 802 it is determined that re-use is above the threshold then at step 804 it is determined to operate the cache not in a streaming mode, and hence at step 806 new cache entries are allocated having an RRPV other than the streaming mode RRPV (which may in general be lower than the streaming mode RRPV).

Concepts described herein may be embodied in a system comprising at least one packaged chip. The apparatus described earlier is implemented in the at least one packaged chip (either being implemented in one specific chip of the system, or distributed over more than one packaged chip). The at least one packaged chip is assembled on a board with at least one system component. A chip-containing product may comprise the system assembled on a further board with at least one other product component. The system or the chip-containing product may be assembled into a housing or onto a structural support (such as a frame or blade).

Figure 9:
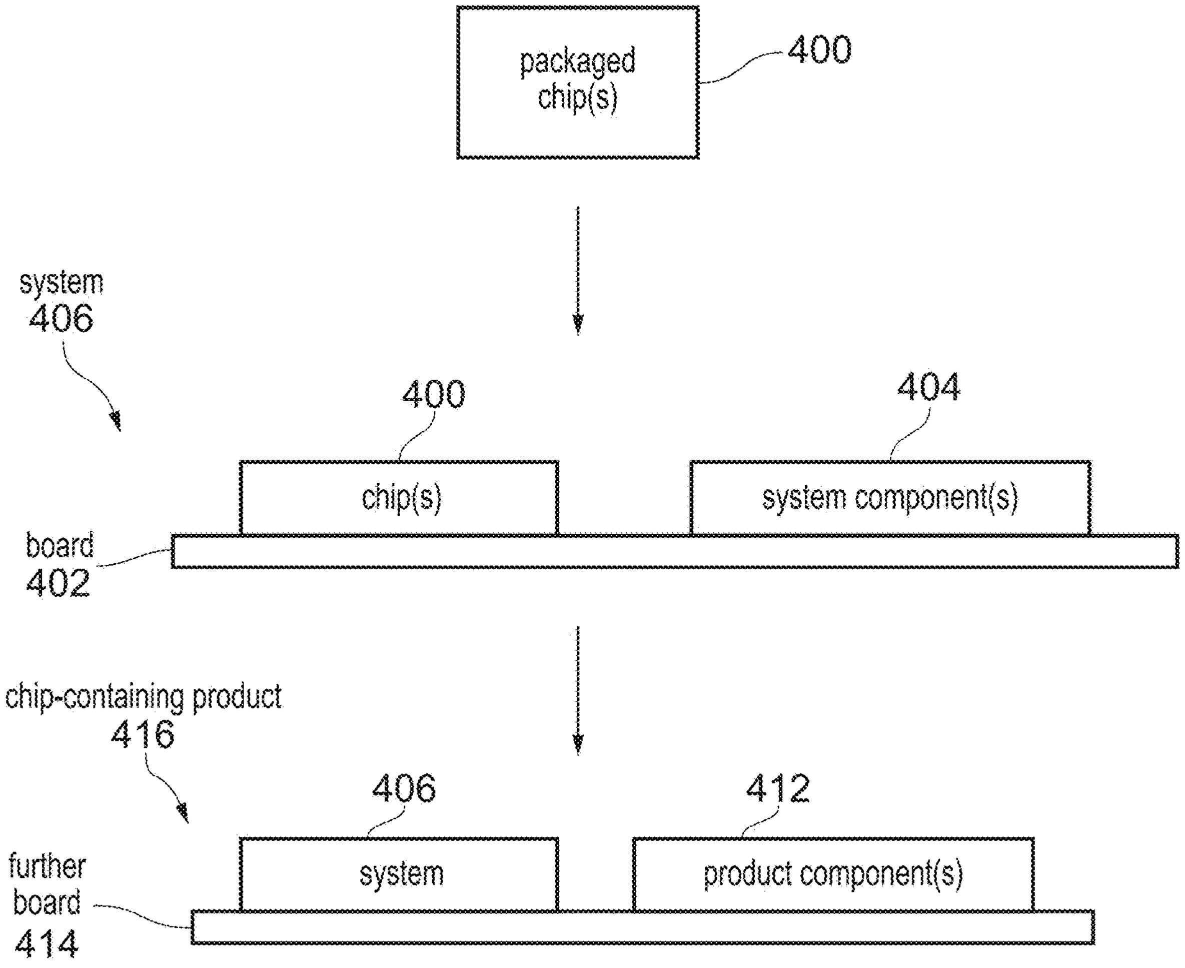
FIG. 9 illustrates a system and a chip-containing product.

As shown in FIG. 9, one or more packaged chips 400, with the apparatus described above implemented on one chip or distributed over two or more of the chips, are manufactured by a semiconductor chip manufacturer. In some examples, the chip product 400 made by the semiconductor chip manufacturer may be provided as a semiconductor package which comprises a protective casing (e.g. made of metal, plastic, glass or ceramic) containing the semiconductor devices implementing the apparatus described above and connectors, such as lands, balls or pins, for connecting the semiconductor devices to an external environment. Where more than one chip 400 is provided, these could be provided as separate integrated circuits (provided as separate packages), or could be packaged by the semiconductor provider into a multi-chip semiconductor package (e.g. using an interposer, or by using three-dimensional integration to provide a multi-layer chip product comprising two or more vertically stacked integrated circuit layers).

In some examples, a collection of chiplets (i.e. modular chips which, when combined, provide the functionality of a larger chip) may itself be referred to as a chip. A chiplet may be packaged individually in a semiconductor package and/or together with other chiplets into a multi-chiplet semiconductor package (e.g. using an interposer, or by using three-dimensional integration to provide a multi-layer chiplet product comprising two or more vertically stacked integrated circuit layers).

The one or more packaged chips 400 are assembled on a board 402 together with at least one system component 404 to provide a system 406. For example, the board may comprise a printed circuit board. The board substrate may be made of any of a variety of materials, e.g. plastic, glass, ceramic, or a flexible substrate material such as paper, plastic or textile material. The at least one system component 404 comprise one or more external components which are not part of the one or more packaged chip(s) 400. For example, the at least one system component 404 could include, for example, any one or more of the following: another packaged chip (e.g. provided by a different manufacturer or produced on a different process node), an interface module, a resistor, a capacitor, an inductor, a transformer, a diode, a transistor and/or a sensor.

A chip-containing product 416 is manufactured comprising the system 406 (including the board 402, the one or more chips 400 and the at least one system component 404) and one or more product components 412. The product components 412 comprise one or more further components which are not part of the system 406. As a non-exhaustive list of examples, the one or more product components 412 could include a user input/output device such as a keypad, touch screen, microphone, loudspeaker, display screen, haptic device, etc.; a wireless communication transmitter/receiver; a sensor; an actuator for actuating mechanical motion; a thermal control device; a further packaged chip; an interface module; a resistor; a capacitor; an inductor; a transformer; a diode; and/or a transistor. The system 406 and one or more product components 412 may be assembled on to a further board 414.

The board 402 or the further board 414 may be provided on or within a device housing or other structural support (e.g. a frame or blade) to provide a product which can be handled by a user and/or is intended for operational use by a person or company.

The system 406 or the chip-containing product 416 may be at least one of: an end-user product, a machine, a medical device, a computing or telecommunications infrastructure product, or an automation control system. For example, as a non-exhaustive list of examples, the chip-containing product could be any of the following: a telecommunications device, a mobile phone, a tablet, a laptop, a computer, a server (e.g. a rack server or blade server), an infrastructure device, networking equipment, a vehicle or other automotive product, industrial machinery, consumer device, smart card, credit card, smart glasses, avionics device, robotics device, camera, television, smart television, DVD players, set top box, wearable device, domestic appliance, smart meter, medical device, heating/lighting control device, sensor, and/or a control system for controlling public infrastructure equipment such as smart motorway or traffic lights.

Concepts described herein may be embodied in computer-readable code for fabrication of an apparatus that embodies the described concepts. For example, the computer-readable code can be used at one or more stages of a semiconductor design and fabrication process, including an electronic design automation (EDA) stage, to fabricate an integrated circuit comprising the apparatus embodying the concepts. The above computer-readable code may additionally or alternatively enable the definition, modelling, simulation, verification and/or testing of an apparatus embodying the concepts described herein.

For example, the computer-readable code for fabrication of an apparatus embodying the concepts described herein can be embodied in code defining a hardware description language (HDL) representation of the concepts. For example, the code may define a register-transfer-level (RTL) abstraction of one or more logic circuits for defining an apparatus embodying the concepts. The code may define a HDL representation of the one or more logic circuits embodying the apparatus in Verilog, SystemVerilog, Chisel, or VHDL (Very High-Speed Integrated Circuit Hardware Description Language) as well as intermediate representations such as FIRRTL. Computer-readable code may provide definitions embodying the concept using system-level modelling languages such as SystemC and SystemVerilog or other behavioural representations of the concepts that can be interpreted by a computer to enable simulation, functional and/or formal verification, and testing of the concepts.

Additionally or alternatively, the computer-readable code may define a low-level description of integrated circuit components that embody concepts described herein, such as one or more netlists or integrated circuit layout definitions, including representations such as GDSII. The one or more netlists or other computer-readable representation of integrated circuit components may be generated by applying one or more logic synthesis processes to an RTL representation to generate definitions for use in fabrication of an apparatus embodying the invention. Alternatively or additionally, the one or more logic synthesis processes can generate from the computer-readable code a bitstream to be loaded into a field programmable gate array (FPGA) to configure the FPGA to embody the described concepts. The FPGA may be deployed for the purposes of verification and test of the concepts prior to fabrication in an integrated circuit or the FPGA may be deployed in a product directly.

The computer-readable code may comprise a mix of code representations for fabrication of an apparatus, for example including a mix of one or more of an RTL representation, a netlist representation, or another computer-readable definition to be used in a semiconductor design and fabrication process to fabricate an apparatus embodying the invention. Alternatively or additionally, the concept may be defined in a combination of a computer-readable definition to be used in a semiconductor design and fabrication process to fabricate an apparatus and computer-readable code defining instructions which are to be executed by the defined apparatus once fabricated.

Such computer-readable code can be disposed in any known transitory computer-readable medium (such as wired or wireless transmission of code over a network) or non-transitory computer-readable medium such as semiconductor, magnetic disk, or optical disc. An integrated circuit fabricated using the computer-readable code may comprise components such as one or more of a central processing unit, graphics processing unit, neural processing unit, digital signal processor or other components that individually or collectively embody the concept.

Concepts described herein may be embodied in an apparatus comprising execution circuitry having one or more vector processing units for performing vector operations on vectors comprising multiple data elements. Execution circuitry having X vector processing units each configured to perform vector operations on Y bit wide vectors, with the respective vector processing units operable in parallel, may be said to have an XxY bit vector datapath. In some embodiments, the execution circuitry is provided having six or more vector processing units. In some embodiments, the execution circuitry is provided having five or fewer vector processing units. In some embodiments, the execution circuitry is provided having two vector processing units (and no more). In some embodiments, the one or more vector processing units are configured to perform vector operations on 128-bit wide vectors. In some embodiments, the execution circuitry has a 2×128 bit vector datapath. Alternatively, in some embodiments the execution circuitry has a 6×128 bit vector datapath.

Concepts described herein may be embodied in an apparatus comprising a level one data (L1D) cache. The L1D cache is a private cache associated with a given processing element (e.g. a central processing unit (CPU) or graphics processing element (GPU)). In a cache hierarchy of multiple caches capable of caching data accessible by load/store operations processed by the given processing element, the L1D cache is a level of cache in the hierarchy which is faster to access than a level two (L2) cache. In some embodiments, the L1 data cache is the fastest to access in the hierarchy, although even faster to access caches, for example, level zero (L0) caches may also be provided. If a load/store operation hits in the L1D cache, it can be serviced with lower latency than if it misses in the L1D cache and is serviced based on data in a subsequent level of cache or in memory. In some embodiments, the L1D cache comprises storage capacity of less than 96 KB, in one example the L1D cache is a 64 KB cache. In some embodiments, the L1D cache comprises storage capacity of greater than or equal to 96 KB, in one example the L1D cache is a 128 KB cache.

Concepts described herein may be embodied in an apparatus comprising a level two (L2) cache. The L2 cache for a given processing element is a level of cache in the cache hierarchy that, among caches capable of holding data accessible to load/store operations, is next fastest to access after the L1D cache. The L2 cache can be looked up in response to a load/store operation missing in the L1D cache or an instruction fetch missing in an L1 instruction cache. In some embodiments, the L2 cache comprises storage capacity of less than 1536 KB (1.5 MB), in one example the L2 cache is a 1024 KB (1 MB) cache. In some embodiments, the L2 cache comprises storage capacity greater than or equal to 1536 KB and less than 2560 KB (2.5 MB), in one example the L2 cache is a 2048 KB (2 MB) cache. In some embodiments, the L2 cache comprises storage capacity greater than or equal to 2560 KB, in one example the L2 cache is a 3072 KB (3 MB) cache. In some embodiments, the L2 cache has a larger storage capacity than the L1D cache.

Figure 10:
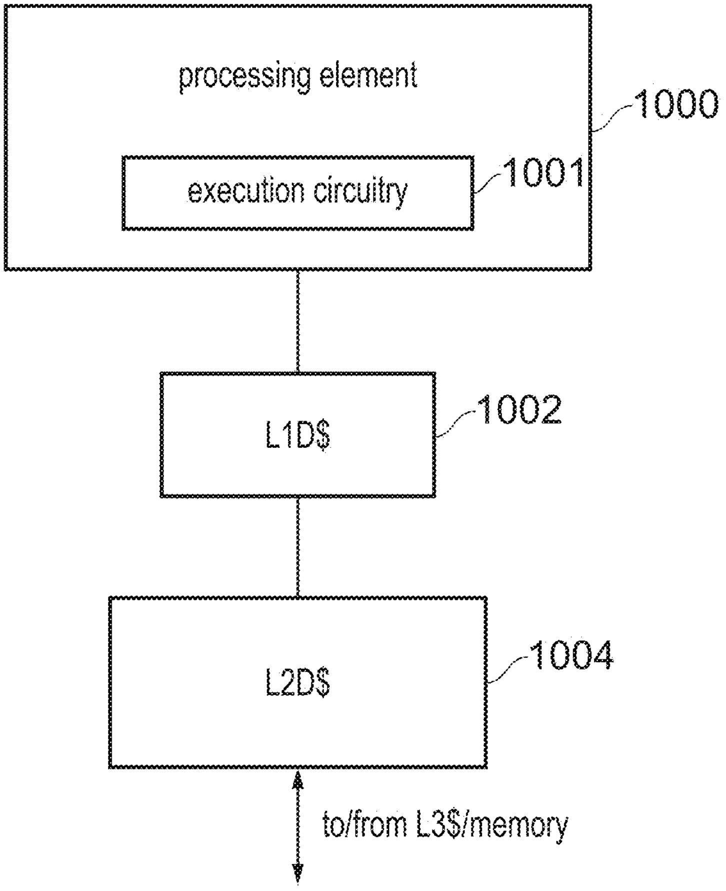
FIG. 10 illustrates an example of an apparatus.

FIG. 10 illustrates an example of an apparatus comprising a processing element 1000 (e.g. a CPU or GPU) comprising execution circuitry 1001 for executing processing operations in response to decoded program instructions. The processing element 1000 has access to a L1D cache 1002 and a L2 cache 1004, which are part of a cache hierarchy of multiple caches for caching data from memory that is accessible by the processing element 1000 in response to load/store operations executed by the execution circuitry 1001. For example, the execution circuitry 1001 may correspond to the pipeline 4, the L1D cache 1002 correspond to the L1D cache 30, and the L2 cache 1004 correspond to the L2 cache 32 illustrated in FIG. 1.

Figure 11:
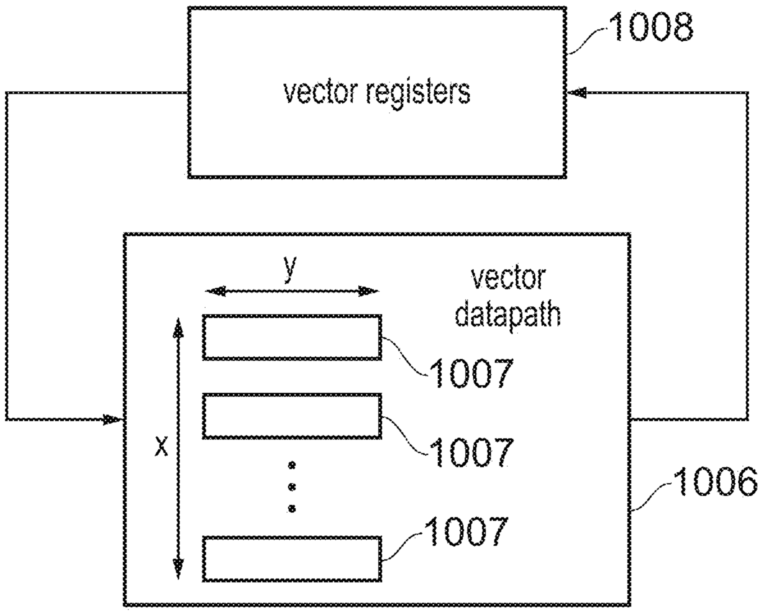
FIG. 11 illustrates an example of a vector datapath.

FIG. 11 illustrates an example of a vector datapath 1006 that may be provided as part of the execution circuitry 1001 of the processing element 1000, and vector registers 1008 for storing vector operands for processing by the vector datapath 1006. Vector operands read from the vector registers 1008 are processed by the vector datapath 1006 to generate vector results which may be written back to the vector registers 1008. The vector datapath 1006 is an XxY bit vector datapath, comprising X vector processing units 1007 each configured to perform vector operations on Y bit vectors. The vector registers 1008 may be accessible as Z bit vector registers, where Z can be equal to Y or different to Y. For a vector operation requiring a Z-bit vector operand where Z is greater than Y, the Z-bit vector operand can be processed using two or more vector processing units 1007 operating in parallel on different portions of the Z-bit vector operand in the same cycle and/or using multiple passes through the vector datapath in two or more cycles. For vector operations requiring a Z-bit vector operand where Z is less than Y, a given vector processing unit 1007 can process two or more vectors in parallel.

Some examples are set out in the following clauses:

(1) An apparatus comprising:

a set associative cache comprising a plurality of cache entries; and cache replacement control circuitry to select, for a given set of the set associative cache, a victim cache entry to be replaced with a new cache entry, wherein the cache replacement control circuitry is configured to select the victim cache entry based on cache replacement selection values for a candidate set of cache entries of the given set, the cache replacement selection value for a given cache entry being indicative of a relative priority with which the given cache entry is to be selected as the victim cache entry, and in response to identifying a plurality of highest victim priority cache entries having equal cache replacement selection values indicative of equal highest priority to be selected as the victim cache entry, the cache replacement control circuitry is configured to select the victim cache entry from the plurality of highest victim priority cache entries based on a set-specific selection criterion, wherein the set-specific selection criterion favours selection of a victim cache entry belonging to a preferred way for the given set, wherein the preferred way differs between at least two sets of the set associative cache.

(2) The apparatus according to clause 1, wherein the cache replacement control circuitry is configured to select the preferred way in dependence on a set index of the given set.

(3) The apparatus according to clause 2, wherein the cache replacement control circuitry is configured to select the preferred way for the given set in dependence on a hash of the set index.

(4) The apparatus according to any of clauses 2 and 3, wherein the set associative cache is an N-way set associative cache, and the cache replacement control circuitry is configured to select the preferred way for the given set in dependence on more than log 2(N) bits of the set index.

(5) The apparatus according to any preceding clause, wherein when a preferred cache entry belonging to the preferred way has the cache replacement selection value indicative of the equal highest priority to be selected as the victim cache entry, the cache replacement control circuitry is configured to select the preferred cache entry as the victim cache entry.

(6) The apparatus according to any preceding clause, wherein when a preferred cache entry belonging to the preferred way does not have the cache replacement selection value indicative of the equal highest priority to be selected as the victim cache entry, the cache replacement control circuitry is configured to select as the victim cache entry the next cache entry, in a predefined order starting from the preferred way, which does have the cache replacement selection value indicative of the equal highest priority.

(7) The apparatus according to any preceding clause, wherein the set associative cache comprises at least two way banks of one or more ways, each way bank being separately accessible via separate access ports.

(8) The apparatus according to clause 7, comprising cache access circuitry configured to perform a first cache access in a first way bank in parallel with a second cache access in a second way bank.

(9) The apparatus according to clause 8, wherein the first cache access is a lookup access to determine whether the first way bank contains a given cache entry.

(10) The apparatus according to clause 9, wherein the cache access circuitry is responsive to the first cache access missing in the first way bank to replay the lookup access.

(11) The apparatus according to any of clauses 8 to 10, wherein the second cache access is an allocation access to allocate a cache entry in the second way bank.

(12) The apparatus according to any preceding clause, wherein, when the set associative cache is being accessed in a streaming mode, the cache replacement control circuitry is configured to allocate the new cache entry in association with a streaming allocation cache replacement selection value, wherein the streaming allocation cache replacement selection value indicates a higher priority for selection of the new cache entry as the victim cache entry than a non-streaming allocation cache replacement selection value.

(13) The apparatus according to clause 12, wherein the cache replacement control circuitry is configured to identify that the set associative cache is being accessed in a streaming mode based on monitoring re-use of at least a subset of the plurality of cache entries.

(14) The apparatus according to any preceding clause, wherein the set associative cache is a level one data cache.

(15) The apparatus according to any preceding clause, comprising execution circuitry comprising a 6×128 bit vector datapath.

(16) A system comprising:

the apparatus of any preceding clause, implemented in at least one packaged chip;

at least one system component; and a board, wherein the at least one packaged chip and the at least one system component are assembled on the board.

(17) A chip-containing product comprising the system of clause 16, wherein the system is assembled on a further board with at least one other product component.

(18) A non-transitory computer-readable medium storing computer-readable code for fabrication of an apparatus, comprising:

a set associative cache comprising a plurality of cache entries; and cache replacement control circuitry to select, for a given set of the set associative cache, a victim cache entry to be replaced with a new cache entry, wherein the cache replacement control circuitry is configured to select the victim cache entry based on cache replacement selection values for a candidate set of cache entries of the given set, the cache replacement selection value for a given cache entry being indicative of a relative priority with which the given cache entry is to be selected as the victim cache entry, and in response to identifying a plurality of highest victim priority cache entries having equal cache replacement selection values indicative of equal highest priority to be selected as the victim cache entry, the cache replacement control circuitry is configured to select the victim cache entry from the plurality of highest victim priority cache entries based on a set-specific selection criterion, wherein the set-specific selection criterion favours selection of a victim cache entry belonging to a preferred way for the given set, wherein the preferred way differs between at least two sets of the set associative cache.

(19) A method comprising:

selecting, for a given set of a set associative cache, a victim cache entry to be replaced with a new cache entry based on cache replacement selection values for a candidate set of cache entries of the given set, the cache replacement selection value for a given cache entry being indicative of a relative priority with which the given cache entry is to be selected as the victim cache entry, and in response to identifying a plurality of highest victim priority cache entries having equal cache replacement selection values indicative of equal highest priority to be selected as the victim cache entry, selecting the victim cache entry from the plurality of highest victim priority cache entries based on a set-specific selection criterion, wherein the set-specific selection criterion favours selection of a victim cache entry belonging to a preferred way for the given set, wherein the preferred way differs between at least two sets of the set associative cache.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

In the present application, lists of features preceded with the phrase "at least one of" mean that any one or more of those features can be provided either individually or in combination. For example, "at least one of: A, B and C" encompasses any of the following options: A alone (without B or C), B alone (without A or C), C alone (without A or B), A and B in combination (without C), A and C in combination (without B), B and C in combination (without A), or A, B and C in combination.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope of the invention as defined by the appended claims.

The invention claimed is:

1. An apparatus comprising:

a set associative cache comprising a plurality of cache entries; and cache replacement control circuitry to select, for a given set of the set associative cache, a victim cache entry to be replaced with a new cache entry, wherein the cache replacement control circuitry is configured to select the victim cache entry based on cache replacement selection values for a candidate set of cache entries of the given set, the cache replacement selection value for a given cache entry being indicative of a relative priority with which the given cache entry is to be selected as the victim cache entry, in response to identifying a plurality of highest victim priority cache entries having equal cache replacement selection values indicative of equal highest priority to be selected as the victim cache entry, the cache replacement control circuitry is configured to select the victim cache entry from the plurality of highest victim priority cache entries based on a set-specific selection criterion, the set-specific selection criterion favors selection of a victim cache entry belonging to a preferred way for the given set, and the preferred way differs between at least two sets of the set associative cache.

2. The apparatus according to claim 1, wherein the cache replacement control circuitry is configured to select the preferred way in dependence on a set index of the given set.

3. The apparatus according to claim 2, wherein the cache replacement control circuitry is configured to select the preferred way for the given set in dependence on a hash of the set index.

4. The apparatus according to claim 2, wherein the set associative cache is an N-way set associative cache, and the cache replacement control circuitry is configured to select the preferred way for the given set in dependence on more than log 2(N) bits of the set index.

5. The apparatus according to claim 1, wherein when a preferred cache entry belonging to the preferred way has the cache replacement selection value indicative of the equal highest priority to be selected as the victim cache entry, the cache replacement control circuitry is configured to select the preferred cache entry as the victim cache entry.

6. The apparatus according to claim 1, wherein when a preferred cache entry belonging to the preferred way does not have the cache replacement selection value indicative of the equal highest priority to be selected as the victim cache entry, the cache replacement control circuitry is configured to select as the victim cache entry the next cache entry, in a predefined order starting from the preferred way, which does have the cache replacement selection value indicative of the equal highest priority.

7. The apparatus according to claim 1, wherein the set associative cache comprises at least two way banks of one or more ways, each way bank being separately accessible via separate access ports.

8. The apparatus according to claim 7, comprising cache access circuitry configured to perform a first cache access in a first way bank in parallel with a second cache access in a second way bank.

9. The apparatus according to claim 8, wherein the first cache access is a lookup access to determine whether the first way bank contains a given cache entry.

10. The apparatus according to claim 9, wherein the cache access circuitry is responsive to the first cache access missing in the first way bank to replay the lookup access.

11. The apparatus according to claim 8, wherein the second cache access is an allocation access to allocate a cache entry in the second way bank.

12. The apparatus according to claim 1, wherein, when the set associative cache is being accessed in a streaming mode, the cache replacement control circuitry is configured to allocate the new cache entry in association with a streaming allocation cache replacement selection value, wherein the streaming allocation cache replacement selection value indicates a higher priority for selection of the new cache entry as the victim cache entry than a non-streaming allocation cache replacement selection value.

13. The apparatus according to claim 12, wherein the cache replacement control circuitry is configured to identify that the set associative cache is being accessed in a streaming mode based on monitoring re-use of at least a subset of the plurality of cache entries.

14. The apparatus according to claim 1, wherein the set associative cache is a level one data cache.

15. The apparatus according to claim 1, comprising execution circuitry comprising a 6×128 bit vector datapath.

16. A system comprising:

the apparatus of claim 1, implemented in at least one packaged chip;

at least one system component; and a board, wherein the at least one packaged chip and the at least one system component are assembled on the board.

17. A chip-containing product comprising the system of claim 16, wherein the system is assembled on a further board with at least one other product component.

18. A method comprising:

selecting, for a given set of a set associative cache, a victim cache entry to be replaced with a new cache entry based on cache replacement selection values for a candidate set of cache entries of the given set, the cache replacement selection value for a given cache entry being indicative of a relative priority with which the given cache entry is to be selected as the victim cache entry, and in response to identifying a plurality of highest victim priority cache entries having equal cache replacement selection values indicative of equal highest priority to be selected as the victim cache entry, selecting the victim cache entry from the plurality of highest victim priority cache entries based on a set-specific selection criterion, wherein the set-specific selection criterion favors selection of a victim cache entry belonging to a preferred way for the given set, and wherein the preferred way differs between at least two sets of the set associative cache.

* * * * *